(12) United States Patent
Imamura

(10) Patent No.: US 10,109,242 B2
(45) Date of Patent: Oct. 23, 2018

(54) DISPLAY DEVICE AND FINDER DEVICE

(71) Applicant: FUJIFILM Corporation, Tokyo (JP)

(72) Inventor: Kenshi Imamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 5 days.

(21) Appl. No.: 15/269,125

(22) Filed: Sep. 19, 2016

(65) Prior Publication Data

US 2017/0004777 A1 Jan. 5, 2017

Related U.S. Application Data

(63) Continuation of application No. PCT/JP2015/051779, filed on Jan. 23, 2015.

(30) Foreign Application Priority Data

Mar. 20, 2014 (JP) .................................. 2014-058418

(51) Int. Cl.
*G09G 3/36* (2006.01)
*G09G 3/34* (2006.01)
(Continued)

(52) U.S. Cl.
CPC ........... *G09G 3/342* (2013.01); *G02B 6/0068* (2013.01); *G02B 6/0083* (2013.01); *G09G 3/36* (2013.01);
(Continued)

(58) Field of Classification Search
CPC ......... G09G 3/34; G09G 3/3406; G09G 3/342
(Continued)

(56) References Cited

U.S. PATENT DOCUMENTS

2006/0119565 A1 6/2006 Matsumoto
2007/0024570 A1* 2/2007 Kumamoto .......... H05B 41/282
345/102
(Continued)

FOREIGN PATENT DOCUMENTS

JP 2001-76525 A 3/2001
JP 2006-164631 A 6/2006
(Continued)

OTHER PUBLICATIONS

English translation of the International Preliminary Report on Patentability (Form PCT/IPEA/409) for International Application No. PCT/JP2015/051779, dated Jul. 27, 2016.
(Continued)

*Primary Examiner* — Roy P Rabindranath
(74) *Attorney, Agent, or Firm* — Birch, Stewart, Kolasch & Birch, LLP

(57) ABSTRACT

This finder display device is provided with a liquid crystal panel, a backlight, and a light source driving section. The backlight has a light guide having a side near which first to sixth light sources are disposed. The light source driving section sets the first and fifth light sources as a first sub-light source group, the second and sixth light sources as a second sub-light source group, and the third and fourth light sources as a third sub-light source group, and periodically supplies driving pulses to the first to third sub-light source groups at respectively different timings. The light source driving section controls the amounts of light of the light source groups by changing the pulse widths of the driving pulses.

9 Claims, 11 Drawing Sheets

(51) Int. Cl.
*F21V 8/00* (2006.01)
*H04N 5/232* (2006.01)

(52) U.S. Cl.
CPC . *H04N 5/23293* (2013.01); *G09G 2320/0247* (2013.01); *G09G 2320/064* (2013.01); *G09G 2320/0646* (2013.01); *G09G 2330/021* (2013.01); *G09G 2360/16* (2013.01)

(58) Field of Classification Search
USPC .......................................................... 345/102
See application file for complete search history.

(56) References Cited

U.S. PATENT DOCUMENTS

| | | | |
|---|---|---|---|
| 2008/0088574 | A1 | 4/2008 | Tsujii |
| 2011/0096101 | A1* | 4/2011 | Lee ..................... G09G 3/3406 345/690 |
| 2011/0193897 | A1* | 8/2011 | Park ...................... G09G 3/003 345/691 |
| 2011/0267382 | A1* | 11/2011 | Fergason ............. G02F 1/1336 345/690 |
| 2011/0292090 | A1* | 12/2011 | Otani ..................... G09G 3/342 345/690 |
| 2012/0120123 | A1 | 5/2012 | Adachi |
| 2012/0133686 | A1* | 5/2012 | Adachi ................. G02F 1/1335 345/690 |
| 2012/0230056 | A1 | 9/2012 | Hanaoka et al. |
| 2013/0120475 | A1 | 5/2013 | Katsu et al. |
| 2015/0022706 | A1 | 1/2015 | Jogetsu et al. |

FOREIGN PATENT DOCUMENTS

| | | |
|---|---|---|
| JP | 2008-102215 A | 5/2008 |
| JP | 2012-68655 A | 4/2012 |
| JP | 2012-103538 A | 5/2012 |
| JP | 2012-118263 A | 6/2012 |
| JP | 2013-8695 A | 1/2013 |
| JP | 2013-9160 A | 1/2013 |
| JP | 2013-92573 A | 5/2013 |
| JP | 2013-92732 A | 5/2013 |
| JP | 2013-104912 A | 5/2013 |
| WO | WO 2011/042999 A1 | 4/2011 |
| WO | WO 2013/153713 A1 | 10/2013 |

OTHER PUBLICATIONS

International Search Report for PCT/JP2015/051779 (PCT/ISA/210) dated Apr. 21, 2015.
Written Opinion of the International Preliminary Examining Authority for (PCT/IPEA/408) dated Apr. 26, 2016.
Written Opinion of the International Searching Authority for PCT/JP2015/051779 (PCT/ISA/237) dated Apr. 21, 2015.

* cited by examiner

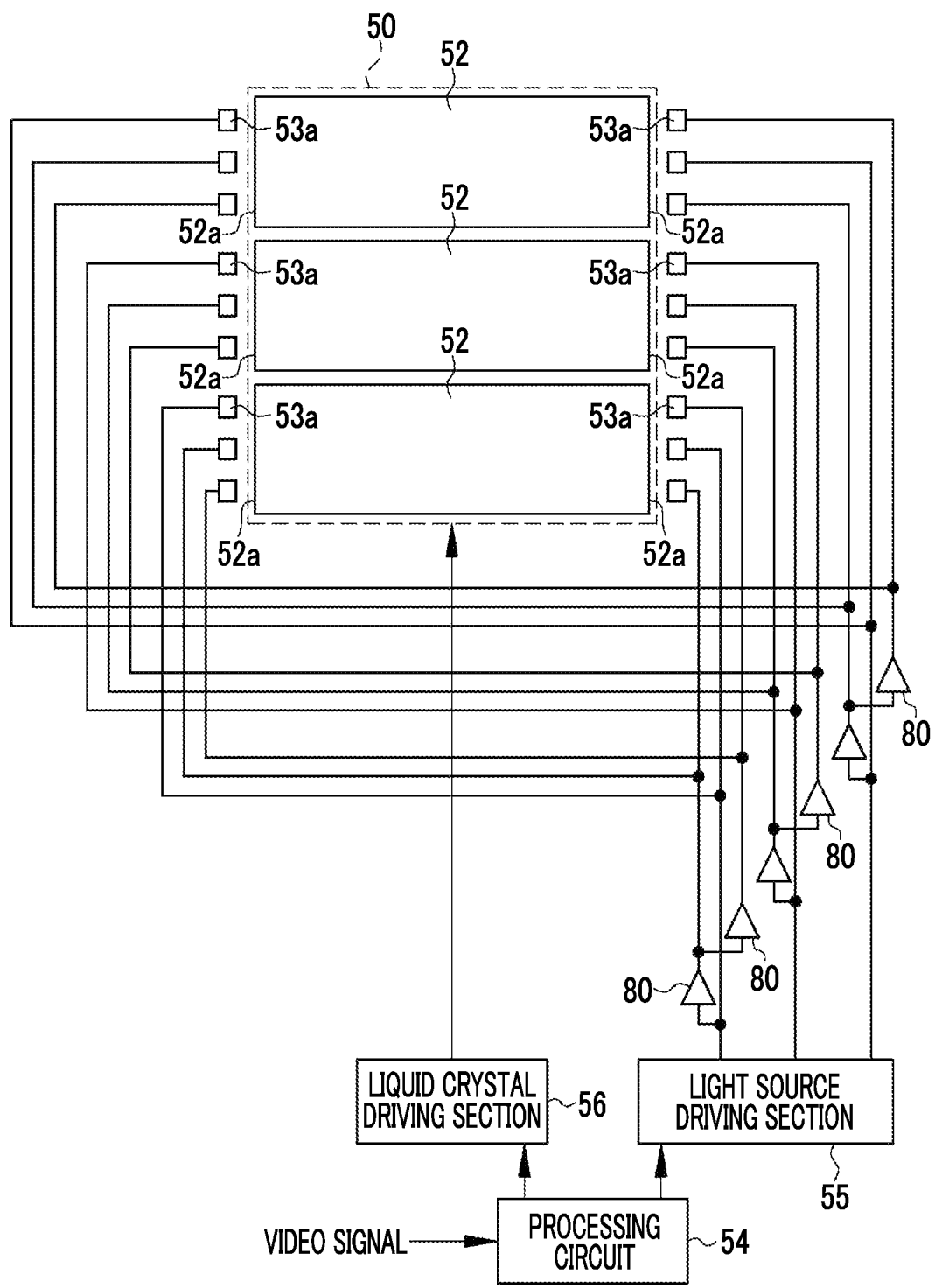

DISPLAY DEVICE AND FINDER DEVICE

CROSS-REFERENCE TO RELATED APPLICATIONS

This application is a Continuation of PCT International Application No. PCT/JP2015/051779 filed on Jan. 23, 2015, which claims priority under 35 U.S.C. § 119(a) to Japanese Patent Application No. 2014-058418 filed Mar. 20, 2014. The above application is hereby expressly incorporated by reference, in its entirety, into the present application.

BACKGROUND OF THE INVENTION

1. Field of the Invention

The present invention relates to a display device and a finder device having an edge-light-type backlight.

2. Description Related to the Prior Art

Liquid crystal display devices include a liquid crystal panel and a backlight. The backlight is disposed on the rear surface of the liquid crystal panel, and illuminates the liquid crystal panel with light. Recently, in order to decrease a thickness of the liquid crystal display device, edge-light-type backlights have been widely used. The edge-light-type backlight includes a light guide and a plurality of light sources disposed along sides of the light guide. Light, which is emitted from the light sources, is incident into the light guide, and is emitted in a planar shape from the light guide toward the light crystal panel.

One or a plurality of light guides is provided in the liquid crystal panel. The amount of light of the light sources is controlled for each light guide. Specifically, processing of controlling the amount of light of the light sources so as to decrease luminances of the light guides corresponding to a dark part of a video and correcting a luminance of a video signal in accordance with the light amount control may be performed (refer to US2012/0230056A, which corresponds to WO2011/042999A). As a result, in the dark part of the video, a contrast, at which a luminance of a displayed image is substantially constant, is improved, and low power consumption of the backlight is achieved. This is called dimming control. In particular, separately controlling the luminances of the plurality of light guides is called local dimming control.

In US2012/0230056A, a plurality of light sources (hereinafter referred to as a light source group) provided for one light guide are connected in series or in parallel with each other, and are periodically driven on the basis of a pulse width modulation (PWM) dimming signal. By changing the pulse width of the PWM dimming signal (that is, changing a duty ratio), the amount of light of the light source group is controlled.

Further, there is a known liquid crystal display device that has an edge-light-type backlight and is used as a display device within an electronic viewfinder device mounted on an imaging apparatus such as a digital camera (refer to JP2013-009160A).

In the display device described in US2012/0230056A, in order to decrease the luminance of the light guide, the pulse width of the PWM dimming signal supplied to the light source group provided for the light guide is set to be short. As described above, if the pulse width of the PWM dimming signal is set to be short, all the light sources included in the light source group are simultaneously turned on in a short time period within one cycle. Consequently, in the display device described in US2012/0230056A, in a case of decreasing the amount of light of the backlight, there is a problem in that flicker occurs in a displayed image of the display device.

Particularly, a display device within the electronic viewfinder device displays an image in a dark environment within a camera main body. Therefore, flicker in the displayed image is more likely to be seen by a photographer, and may cause discomfort to the photographer.

SUMMARY OF THE INVENTION

The present invention has an object to provide a display device and a finder device capable of reducing flicker of a displayed image in a case of decreasing the amount of light of a backlight.

In order to achieve the above-mentioned object, a display device of the present invention comprises a liquid crystal panel, a backlight, common lines and a light source driving section. The backlight illuminates the liquid crystal panel with light and has at least one light guide having a first side and a second side facing the first side on both of which a light source group formed of plural light sources is disposed. Each of the common lines is provided for each of plural sub-light source groups divided from the light source group. The light sources included in each of the sub-light source groups are connected commonly to the common line. To the light source driving section one of the plural common lines is connected. The light source driving section supplies driving pulses to the connected common line. Each of the sub-light source groups includes at least one of the light sources on the first side and at least one of the light sources on the second side. The light source on the first side and the light source on the second side belonging to the same sub-light source group are not facing each other. Each of the plural common lines except the common line connected to the light source driving section are connected through at least one signal delay circuit to the common line connected to the light source driving section. The driving pulses are supplied to each of the sub-light source groups at respectively different timings.

It is preferable that the light source driving section changes an amount of light of each sub-light source group by changing pulse widths of the driving pulses.

The display device further comprises a luminance detection section that detects a luminance of a video on the basis of a video signal supplied to the liquid crystal panel. It is preferable that the light source driving section changes the amount of light in accordance with the luminance which is detected by the luminance detection section. It is preferable that the light source driving section decreases the amount of light in accordance with a degree of a decrease in the luminance of the video.

It is preferable that the light source driving section supplies the driving pulses to each sub-light source group at predetermined time periods. It is preferable that the light source driving section matches the pulse widths of the driving pulses with the time periods in a case where the amount of light is maximized.

A plurality of the light guides is provided in the backlight. The luminance detection section detects a luminance of a region corresponding to each light guide on the basis of the video signal. It is preferable that the light source driving section changes the amount of light for each light guide, in accordance with the luminance which is detected by the luminance detection section.

The display device further comprises a video signal correction section, and a liquid crystal driving section. The video signal correction section corrects a gain in luminance information of the video signal in accordance with an amount of change in the amount of light. The liquid crystal driving section drives the liquid crystal panel on the basis of the video signal of which the gain is corrected by the video signal correction section.

Another display device of the present invention comprises a liquid crystal panel, a backlight, common lines and a light source driving section. The backlight that illuminates the liquid crystal panel with light, and has at least one light guide having one side only on which a light source group formed of plural light sources is disposed. Each of the common lines is provided for each of plural sub-light source groups divided from the light source group. The light sources included in each of the sub-light source groups are connected commonly to the common line. To the light source driving section, one of the plural common lines is connected. The light source driving section supplies driving pulses to the connected common line. The two adjacent light sources are not included in the same sub-light source group. Each of the plural common lines except the common line connected to the light source driving section are connected through at least one signal delay circuit to the common line connected to the light source driving section. The driving pulses are supplied to each of the sub-light source groups at respectively different timings.

A finder device of the present invention comprises a liquid crystal panel, a backlight, common lines and a light source driving section. The backlight illuminates the liquid crystal panel with light and has at least one light guide having a first side and a second side facing the first side on both of which a light source group formed of plural light sources is disposed. Each of the common lines is provided for each of plural sub-light source groups divided from the light source group. The light sources included in each of the sub-light source groups are connected commonly to the common line. To the light source driving section one of the plural common lines is connected. The light source driving section supplies driving pulses to the connected common line. Each of the sub-light source groups includes at least one of the light sources on the first side and at least one of the light sources on the second side. The light source on the first side and the light source on the second side belonging to the same sub-light source group are not facing each other. Each of the plural common lines except the common line connected to the light source driving section are connected through at least one signal delay circuit to the common line connected to the light source driving section. The driving pulses are supplied to each of the sub-light source groups at respectively different timings.

According to the present invention, driving pulses are supplied to a plurality of the sub-light source groups divided from a light source group formed of plural light sources, at respectively different timings. Therefore, it is possible to reduce flicker in the displayed image in a case of decreasing the amount of light of the backlight.

BRIEF DESCRIPTION OF DRAWINGS

For more complete understanding of the present invention, and the advantage thereof, reference is now made to the subsequent descriptions taken in conjunction with the accompanying drawings, in which:

FIG. 11 is a diagram illustrating an example in which a plurality of light guides is provided.

DESCRIPTION OF THE PREFERRED EMBODIMENTS

Figure 1:
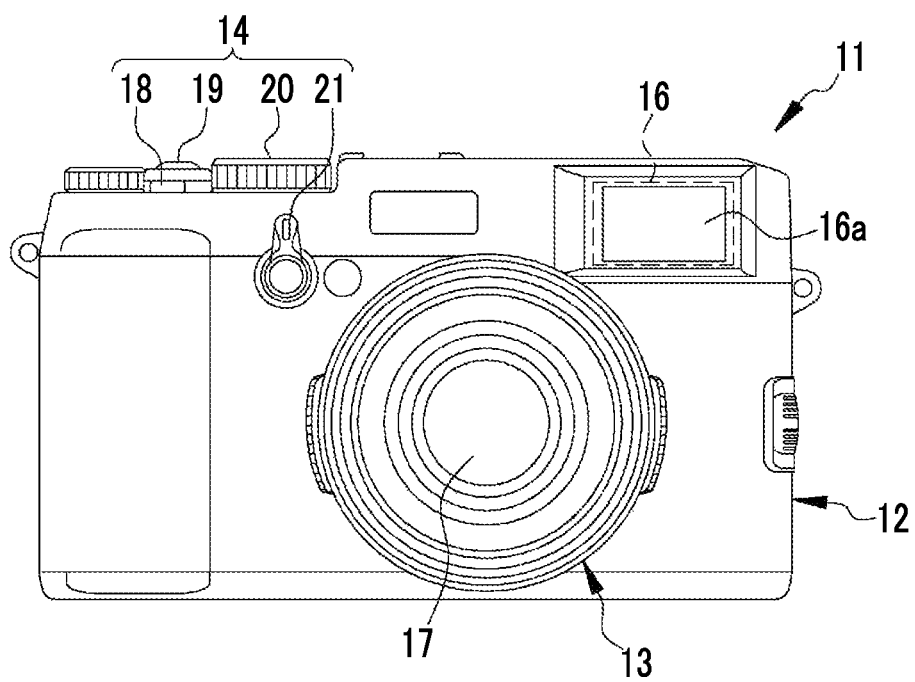
FIG. 1 is a front view of a digital camera.
Figure 2:
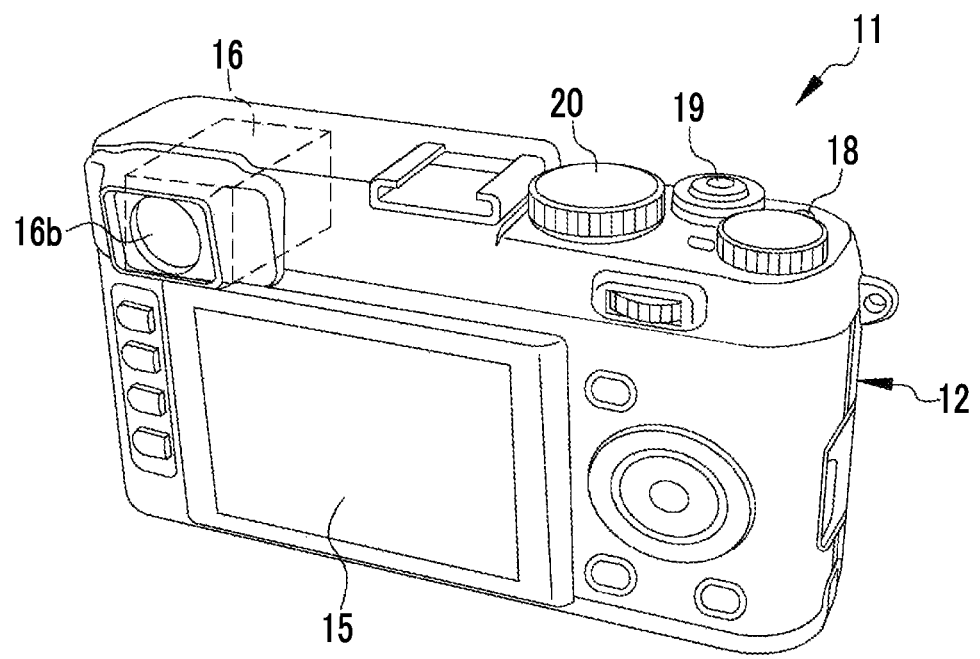
FIG. 2 is a perspective view of the rear side of the digital camera.

In FIGS. 1 and 2, the digital camera 11 comprises a camera main body 12, a lens barrel 13, an operation section 14, a rear side display section 15, and a finder device 16. The lens barrel 13 is provided on the front side of the camera main body 12 so as to hold an imaging lens 17. The finder device 16 is a hybrid type capable of switching between an optical viewfinder (OVF) mode and an electronic viewfinder (EVF) mode.

The operation section 14 has a power supply button 18, a release button 19, a mode selection dial 20, a finder switch lever 21, and the like. The power supply button 18 is operated when a power source (not shown in the drawing) of the digital camera 11 is turned on/off. The release button 19 is operated when imaging is performed. The mode selection dial 20 is operated when the operation mode of the digital camera 11 is switched. The finder switch lever 21 is operated when the finder device 16 is switched between the OVF mode and the EVF mode.

The release button 19 has a two-stage-stroke-type switch (not shown in the drawing) including a S1 switch and a S2 switch. The digital camera 11 performs an imaging preparation operation such as an auto focus (AF) operation if the release button 19 is pressed down (pressed halfway) and the S1 switch is turned on. From this state, if the release button 19 is further pressed down (pressed fully) and the S2 switch is turned on, the digital camera 11 performs the imaging operation.

The operation modes of the digital camera 11 include a still image capturing mode, a moving image capturing mode, a reproduction mode, and the like. In the still image capturing mode, a still image is acquired. In the moving image capturing mode, a moving image is acquired. In the reproduction mode, each acquired image is reproduced and displayed on the rear side display section 15. The rear side display section 15 is provided on the rear side of the camera main body 12, and displays images acquired in various imaging modes and a menu screen for performing various settings.

The finder device 16 has a finder window 16a, which includes an optical image of a subject, and a finder eyepiece section 16b with which an eye of a photographer comes into contact. The finder window 16a is provided on the front side of the camera main body 12. The finder eyepiece section 16b is provided on the rear side of the camera main body 12.

Further, in the finder device 16, a liquid crystal display device (EVFLCD) 41 (refer to FIG. 3) for the EVF mode is provided. The finder device 16 guides the optical image of the subject to the finder eyepiece section 16b in the case of the OVF mode, and guides a displayed image of an EVFLCD 41 to the finder eyepiece section 16b.

The EVFLCD 41 displays a live view image until imaging is performed until the operation mode is set as the still image capturing mode or the moving image capturing mode. A photographer observes the live view image, which is displayed on the EVFLCD 41, from the finder eyepiece section 16b, whereby it is possible to determine the composition of the subject.

Further, a slot (not shown in the drawing) for mounting a recording medium 40 (refer to FIG. 3) to be described later is provided on the bottom of the camera main body 12.

Figure 3:
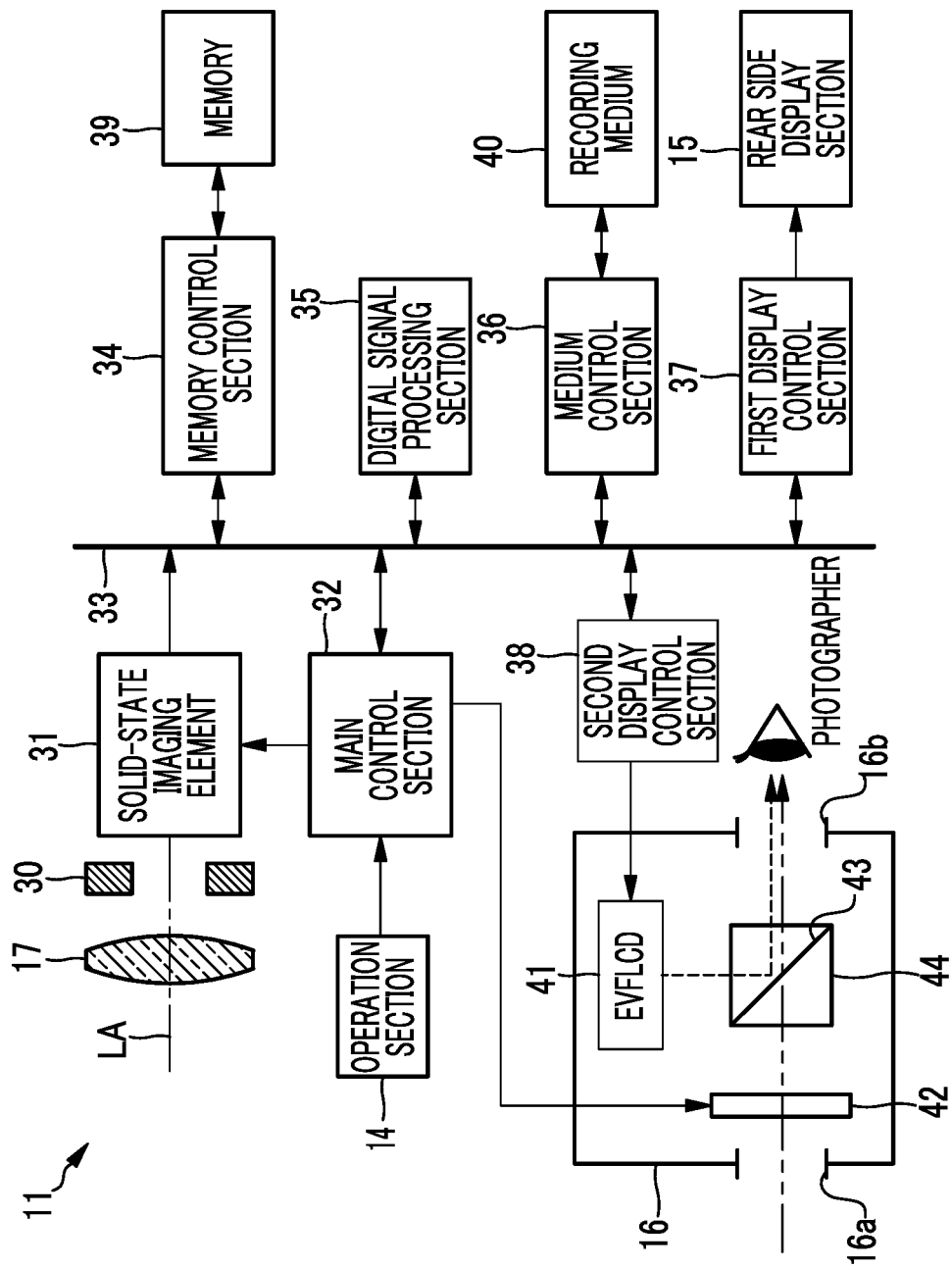
FIG. 3 is a block diagram illustrating an electrical configuration of the digital camera.

In FIG. 3, a diaphragm 30 and a solid-state imaging element 31 are provided along the optical axis LA of the imaging lens 17 in the lens barrel 13. An optical image of a subject, which passes through the imaging lens 17 and of which an amount of light is adjusted through the diaphragm 30, is incident into the solid-state imaging element 31.

The solid-state imaging element 31 is, for example, a CMOS (Complementary Metal Oxide Semiconductor) type image sensor having a single-plate color imaging type which has a RGB color filter, and has a light receiving surface formed of a plurality of pixels (not shown in the drawing) arranged in a two-dimensional matrix shape. Each pixel includes a photoelectric conversion element, and photoelectrically converts an optical image, which is formed on the light receiving surface, so as to generate a captured image signal.

Further, the solid-state imaging element 31 has a denoising circuit, an auto gain controller, and a signal processing circuit such as an analog-to-digital (A/D) conversion circuit (any of those is not shown in the drawing). The denoising circuit performs denoising processing on the captured image signal. The auto gain controller amplifies a level of the captured image signal to an optimum value. The A/D conversion circuit converts the captured image signal into a digital signal, and outputs the signal from the solid-state imaging element 31. The output signal of the solid-state imaging element 31 is image data (so-called RAW data) having one color signal for each pixel.

The solid-state imaging element 31 performs driving control through a main control section 32 in response to the imaging mode which is selected by the mode selection dial 20.

The solid-state imaging element 31 and the main control section 32 are connected to a bus 33. Otherwise, a memory control section 34, a digital signal processing section 35, a medium control section 36, a first display control section 37, and a second display control section 38 are connected to the bus 33.

A memory 39 for a temporary storage such as synchronous dynamic random access memory (SDRAM) is connected to the memory control section 34. The memory control section 34 inputs the image data, which is output from the solid-state imaging element 31, to the memory 39, and stores the image data. Further, the memory control section 34 outputs the image data, which is stored in the memory 39, to the digital signal processing section 35.

The digital signal processing section 35 performs defect correction processing, demosaic processing, gamma correction processing, white balance correction processing, YC conversion processing, and the like on the image data (RAW data) which is input from the memory 39, and generates YC image data formed of a luminance signal Y and a color difference signal C.

The medium control section 36 controls recording of image files into the recording medium 40 and reading of the image files from the recording medium 40. The recording medium 40 is, for example, a memory card into which a flash memory and the like are built.

In a case of the still image capturing mode, as the image files, for example, compressed image data, which is obtained by compressing the YC image data in conformity with the JPEG standard, is recorded into the recording medium 40. Further, in a case of the moving image capturing mode, moving image data, which is obtained by compressing the YC image data of a plurality of frames obtained through moving image capturing in conformity with the MPEG-4 standard, recorded into the recording medium 40. Such compression processing is performed by the digital signal processing section 35. In addition, in the case of the moving image capturing mode, in addition to the images, sound is acquired and recorded, but in the present embodiment, a description of a configuration for acquiring and recording sound will be omitted.

The first display control section 37 controls image display on the above-mentioned rear side display section 15. Specifically, the first display control section 37 converts the YC image data, which is generated by the digital signal processing section 35, into a video signal complying with the NTSC standard, and outputs the signal to the rear side display section 15.

The second display control section 38 converts the YC image data into the video signal in a manner similar to the first display control section 37, and outputs the data to the EVFLCD 41 provided in the finder device 16.

An OVF shutter 42 and a prism 44 are provided in the finder device 16 between the finder window 16a and the finder eyepiece section 16b. A half mirror 43 is formed inside the prism 44. The OVF shutter 42 is a liquid crystal shutter, and is disposed between the finder window 16a and the prism 44.

The OVF shutter 42 is controlled by the main control section 32 such that it switches between "a closed state", in which the optical image of the subject incident from the finder window 16a is not incident into the prism 44 by blocking light of the optical image, and "an opened state" in which the optical image is incident into the prism 44. The half mirror 43 is disposed to form an angle of 45 degrees between an optical path of the optical image and an optical path of the displayed image which is displayed on the EVFLCD 41.

The main control section 32 switches the finder device 16 between the OVF mode and the EVF mode by performing opening-closing control of the OVF shutter 42 and the display control of the EVFLCD 41 on the basis of the operation of the finder switch lever 21.

In the case of the OVF mode, the OVF shutter 42 is in the opened state, and thus the EVFLCD 41 is in a non-display state. Therefore, the optical image of the subject, which is incident from the finder window 16a, passes through the half mirror 43, and is guided into the finder eyepiece section 16b. In the case of the EVF mode, the OVF shutter 42 is in the closed state, and thus a subject image is displayed on the EVFLCD 41. Therefore, the displayed image is reflected by the half mirror 43, and is guided into the finder eyepiece section 16b. At the time of the EVF mode, a live view image of the subject is displayed on the EVFLCD 41.

Further, in the case of the OVF mode, by displaying information such as imaging information on the EVFLCD 41, the information image may overlap with the optical image of the subject, and may be guided into the finder eyepiece section 16b.

Figure 4:
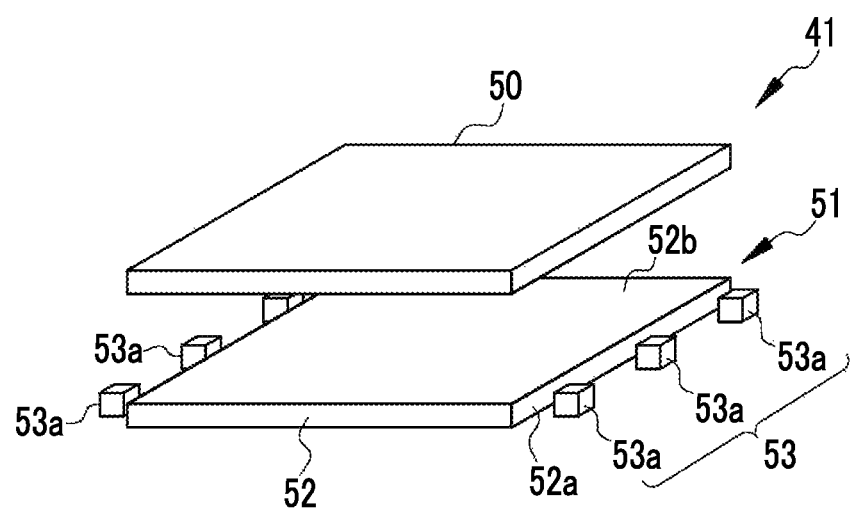
FIG. 4 is a perspective view illustrating a configuration of a backlight.

In FIG. 4, the EVFLCD 41 has a liquid crystal panel 50 and an edge-light-type backlight 51. The liquid crystal panel 50 has a transmissive liquid crystal panel having a plurality of liquid crystal cells. The backlight 51 includes a light guide 52 having a rectangular plate shape and a light source group 53. The light source group 53 is formed of a plurality of light sources 53a which are arranged along the two sides of the light guide 52 opposite to each other. Each light source 53a includes a light emitting diode.

The light guide 52 is formed of a transparent resin (a methacryl resin, an acryl resin, a polycarbonate resin, or the like) having a high light transmittance. The side surfaces of the light guide 52, toward which the light source group 53 faces, are incidence end faces 52a to which light emitted from the light sources 53a are incident. The upper surface of the light guide 52 is an exit surface 52b from which light is emitted. The exit surface 52b faces the liquid crystal panel 50, and irradiates the surface of the liquid crystal panel 50 with light.

A reflection sheet (not shown in the drawing) is disposed on the lower surface of the light guide 52 which is opposite to the exit surface 52b. The reflection sheet reflects light, which propagates toward the lower surface of the light guide 52, and guides the light into the exit surface 52b. Further, a diffusion sheet (not shown in the drawing) is provided on the exit surface 52b. The diffusion sheet diffuses light which is emitted from the exit surface 52b, and makes light uniform in a surface direction.

Figure 5:
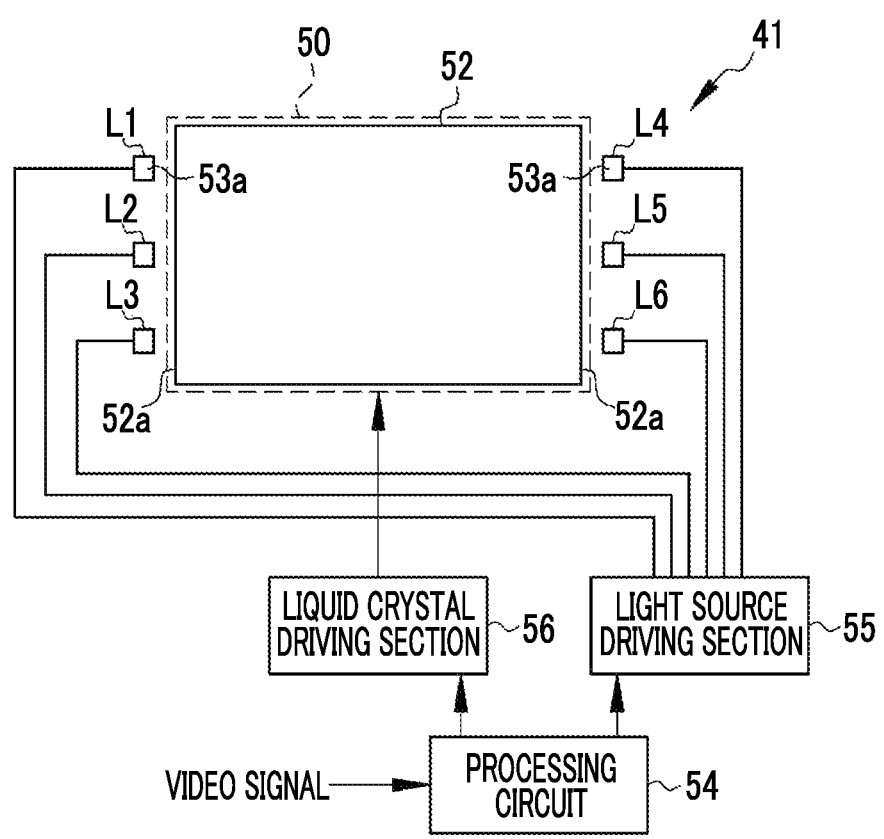
FIG. 5 is a block diagram illustrating a configuration of the backlight.

Further, as shown in FIG. 5, a processing circuit 54, a light source driving section 55, and a liquid crystal driving section 56 are provided in the EVFLCD 41. The processing circuit 54 performs processing for dimming control. Specifically, the processing circuit 54 calculates (detects) an average luminance of a video from luminance information of the video signal which is input from the second display control section 38, and inputs the luminance information to the light source driving section 55. The light source driving section 55 adjusts the luminance of the backlight 51 by controlling an amount of light of the light source group 53 on the basis of the luminance information which is input from the processing circuit 54. Specifically, the light source driving section 55 controls the light source group 53 such that it decreases the luminance of the backlight 51 in accordance with a decrease in the luminance of the video.

Further, the processing circuit 54 corrects the gain of the luminance information of the video signal in accordance with an amount of change in the amount of light of the light source group 53, and inputs the information to the liquid crystal driving section 56. The liquid crystal driving section 56 changes a transmittance of each liquid crystal cell of the liquid crystal panel 50 on the basis of the video signal which is subjected to the gain correction and which is input from the processing circuit 54. Specifically, in a case where the processing circuit 54 changed the amount of light of the light source group 53 so as to decrease the luminance of the backlight 51, the luminance of the image, which is displayed on the EVFLCD 41, is set to be constant by performing the gain correction so as to increase the luminance of the video signal in accordance with the amount of change in the amount of light. Thereby, improvement in contrast and power saving of the EVFLCD 41 is achieved.

As described above, the processing circuit 54 functions as a luminance detection section and a video signal correction section described in claims.

Next, the light amount control of the light source group 53 performed by the light source driving section 55 will be described. The light source group 53 is formed of three light sources 53a (hereinafter distinctively referred to as first to third light sources L1 to L3), which are provided along one of the incidence end faces 52a of the light guide 52 opposite to each other, and three light sources 53a (hereinafter distinctively referred to as fourth to sixth light sources L4 to L6) which are provided along the other of the incidence end faces 52a.

In the present embodiment, the light sources 53a are separately wired to the light source driving section 55, and are respectively separately controlled such that those are turned on by the light source driving section 55. The light source driving section 55 supplies driving pulses to the light sources 53a.

Figure 6:
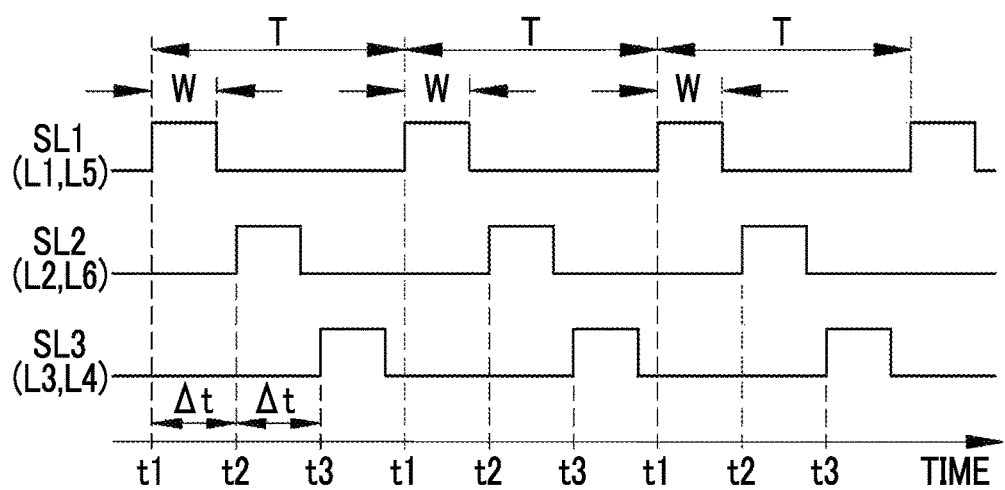
FIG. 6 is a timing chart of driving pulses for driving light source groups.

Specifically, among the first to sixth light sources L1 to L6, the light source driving section 55 sets the first and fifth light sources L1 and L5 as a first sub-light source group SL1, and sets the second and sixth light sources L2 and L6 as a second sub-light source group SL2, and sets the third and fourth light sources L3 and L4 as a third sub-light source group SL3. Then, as shown in FIG. 6, the light source driving section 55 supplies the driving pulses to the first to third sub-light source groups SL1 to SL3 at respectively different timings.

Each driving pulse is a pulse width modulation (PWM) dimming signal in which a pulse part having a pulse width W repeatedly appears at a predetermined time period T. Rising times (light emitting start times) t1 to t3 of the driving pulses supplied to the first to third sub-light source groups SL1 to SL3 within each time period T are different from one another, and each period is shifted by a time period Δt. Each light emitting time period of the first to third sub-light source groups SL1 to SL3 is defined by the pulse width W.

Figure 7:
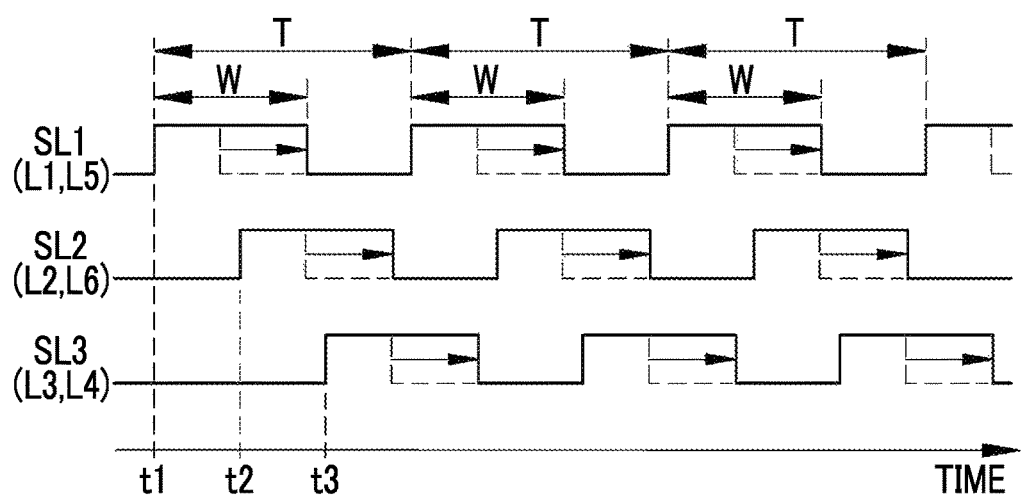
FIG. 7 is a timing chart illustrating a method of changing amounts of light of the light source groups.

As shown in FIG. 7, the light source driving section 55 controls the amount of light of the light source group 53 by changing the pulse width W (that is, changing the duty ratio) without changing the rising times t1 to t3 of the driving pulses within each time period T. In a case where the amount of light of the light source group 53 is maximized, the pulse width W is matched with the time period T. In this case, a high-level fixed signal is input as a driving signal to the first to third sub-light source groups SL1 to SL3.

Further, each of the first to third sub-light source groups SL1 to SL3 includes one of the two light sources 53a which are disposed to face each other, and does not includes both of those. For example, the first sub-light source group SL1 includes the first light source L1 of the first and fourth light sources L1 and L4 which are disposed to face each other. The reason for this is as follows. In a case where the two light sources 53a disposed to face each other emit light simultaneously, substantially the same location within the light guide 52 is illuminated with the light, which is emitted from the two light sources 53a, and thus unevenness in luminance within the light guide 52 increases.

As described above, in the backlight 51, at the time of light emitting of the light source group 53, all the light sources 53a do not emit light simultaneously, and the first to third sub-light source groups SL1 to SL3 sequentially emit light in time. Hence, occurrence of flicker in the displayed image on the EVFLCD 41 is reduced by decreasing the pulse width W so as to decrease the amount of light of the backlight 51.

Next, operations of the digital camera 11 will be described. First, if a user operates the power supply button 18 so as to turn on the power, a power supply voltage is supplied to each section of the digital camera 11. If the user operates the mode selection dial 20 so as to set the operation mode as the still image capturing mode or the moving image capturing mode and the EVF mode is further set by the finder switch lever 21, the EVFLCD 41 displays a live view image of a subject.

The live view image display is performed in the following manner. The main control section 32 causes the solid-state imaging element 31 to periodically and repeatedly perform an imaging operation, and the second display control section 38 causes the EVFLCD 41 to display an image based on the image data which is output from the solid-state imaging element 31.

At this time, the processing circuit 54 within the EVFLCD 41 calculates the average luminance of the video on the basis of the video signal which is periodically input from the second display control section 38, inputs the luminance information to the light source driving section 55, corrects the luminance information of the video signal in accordance with the luminance information, and inputs the information to the liquid crystal driving section 56. The light source driving section 55 controls the pulse width W of the driving pulses supplied to the first to third sub-light source groups SL1 to SL3 on the basis of the luminance information. The liquid crystal driving section 56 drives the liquid crystal panel 50 on the basis of the video signal in which the luminance information is corrected.

Accordingly, in a case where the luminance of the video signal is low, the amount of light of the backlight 51 can be decreased by decreasing the pulse width W of the driving pulses, and an image is displayed on the liquid crystal panel 50 on the basis of the video signal of which the gain is corrected by an amount of decrease in the amount of light. Thereby, consumed power of the backlight 51 is reduced without change in luminance of the displayed image. Further, as described above, at the time of light emitting of the backlight 51, the first to third sub-light source groups SL1 to SL3 sequentially emit light in time. Therefore, flicker in the displayed image is reduced.

The user views the displayed image on the EVFLCD 41 through the finder eyepiece section 16*b*, whereby the composition of the subject is determined, and imaging is performed. For example, in the case of the still image capturing mode, if the release button 19 is pressed halfway and pressed fully by the user, the image data, which is obtained by the solid-state imaging element 31, is converted into the compressed image data by the digital signal processing section 35, and is recorded into the recording medium 40 through the medium control section 36. Further, the first display control section 37 causes the rear side display section 15 to display the image based on the image data.

In the embodiment, the number of the light sources 53*a* constituting the light source group 53 is set to 6, and the number of the light sources constituting the sub-light source group is set to two. However, the numbers are not limited to this. The N light sources selected from the light source group formed of the M light sources may be set as a sub-light source group, and a plurality of sub-light source groups may be set to have mutually different combinations of the N light sources. Here, M and N are positive integers, and satisfy a relationship of M>N.

In the embodiment, the light sources included in each sub-light source group may be fixed. However, each sub-light source group may have the same number of light sources, and the light sources included in each sub-light source group may be changed in time.

Figure 8:
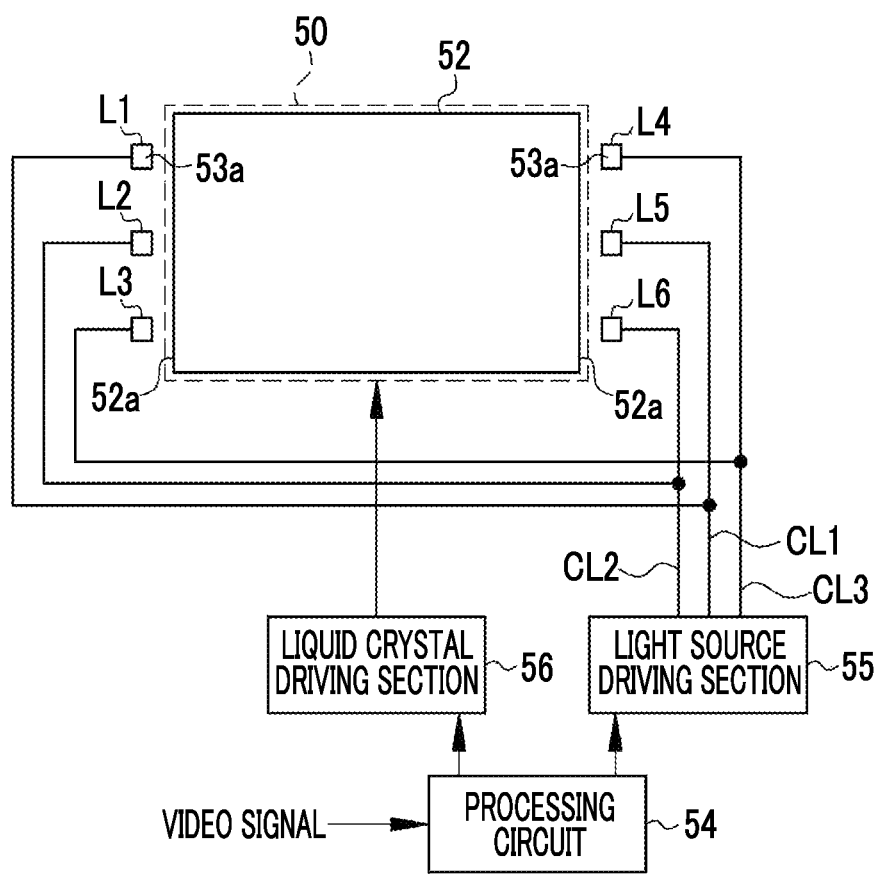
FIG. 8 is a diagram illustrating an example in which sub-light source groups are connected to a light source driving section through common lines.

In the embodiment, as shown in FIG. 5, the light sources 53*a* are separately wired to the light source driving section 55. However, as shown in FIG. 8, the plurality of light sources 53*a* included in the sub-light source groups may be connected to the common lines which are identical, and may be connected to the light source driving section 55.

Specifically, the first and fifth light sources L1 and L5 included in the first sub-light source group SL1 are connected to a first common line CL1. The second and sixth light sources L2 and L6 included in the second sub-light source group SL2 are connected to a second common line CL2. The third and fourth light sources L3 and L4 included in the third sub-light source group SL3 are connected to a third common line CL3. Then, the first to third common lines CL1 to CL3 are connected to the light source driving section 55. Thereby, the light source driving section 55 does not separately supply the driving pulses to the light sources 53*a*, and preferably supplies the driving pulses in units of the sub-light source groups. As a result, the driving control is simplified.

Figure 9:
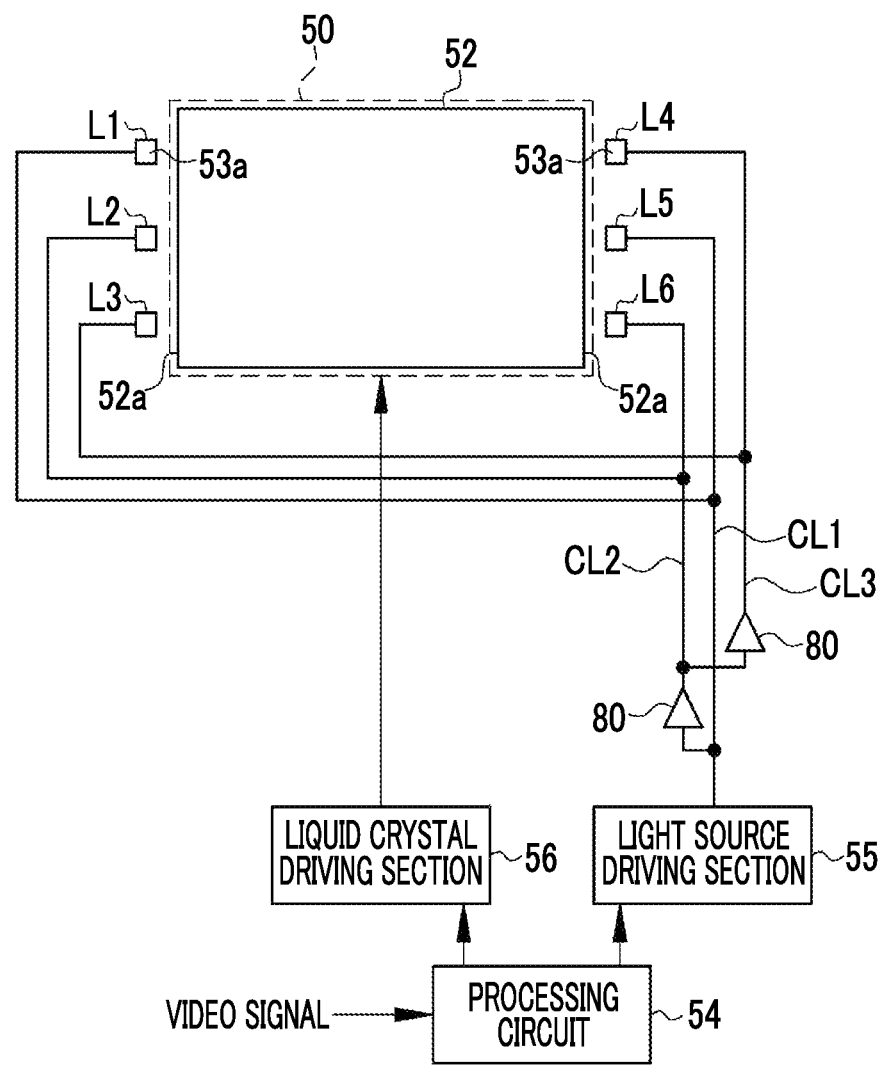
FIG. 9 is a diagram illustrating an example in which the common lines are connected to each other through a signal delay circuit.

As shown in FIG. 9, the first to third common lines CL1 to CL3 may be connected to each other through signal delay circuits 80. Specifically, the first common line CL1 is connected to the light source driving section 55, and the second common line CL2 is connected to the first common line CL1 through the signal delay circuits 80. Then, the second common line CL2 is connected to the third common line CL3 through the signal delay circuit 80. Each signal delay circuit 80 delays the driving pulses by the above-mentioned time period Δt.

Accordingly, the driving pulses, which are supplied from the light source driving section 55 to the first common line CL1, are delayed by the time period Δt through the signal delay circuit 80, and are supplied to the second common line CL2. Furthermore, the delayed driving pulses are delayed by the time period Δt through the signal delay circuit 80, and are supplied to the third common line CL3. As described above, the light source driving section 55 is able to respectively supply the plurality of driving pulses, which are shifted in time as shown in FIG. 6, to the first to third sub-light source groups SL1 to SL3 only by periodically generating one driving pulse.

In the embodiment, the plurality of light sources 53*a* is disposed near the two sides of the light guide 52 opposite to each other, but the plurality of light sources 53*a* may be disposed near one side thereof. In this case, in order to reduce unevenness in luminance, it is preferable that each sub-light source group does not include the two light sources 53*a* adjacent to each other.

Figure 10:
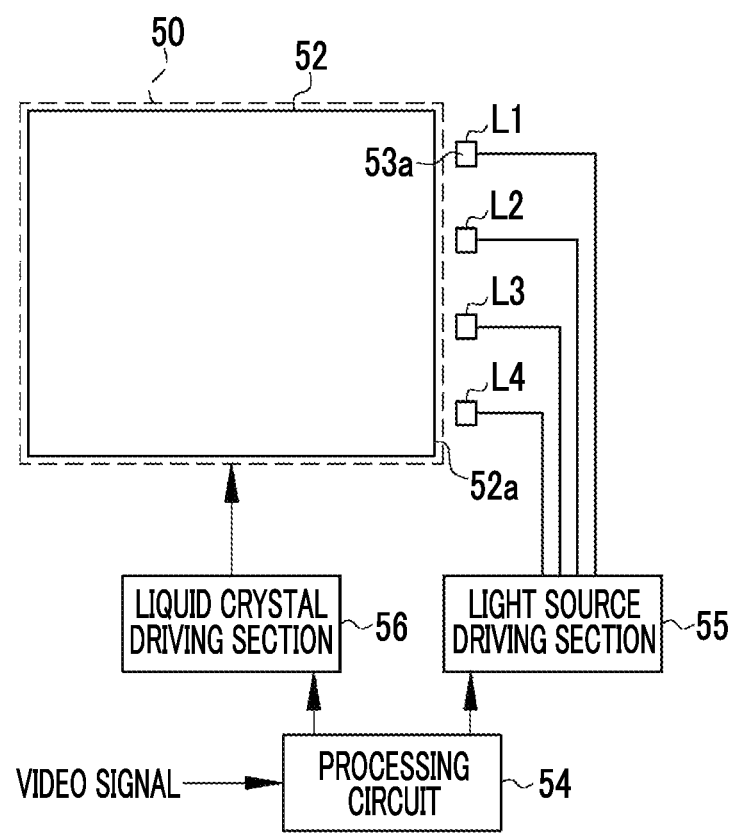
FIG. 10 is a diagram illustrating an example in which the light sources are disposed near only one side of the light guide.

For example, as shown in FIG. 10, the four light sources 53*a* (hereinafter distinctively referred to as the first to fourth light sources L1 to L4) are disposed along one incidence end face 52*a* of the light guide 52. The first and third light sources L1 and L3 are set as the first sub-light source group SL1, and the second and fourth light sources L2 and L4 are set as the second sub-light source group SL2. The light source driving section 55 supplies the first and second sub-light source groups SL1 and SL2 at respectively different timings. The other configuration is the same as that of the embodiment.

In the embodiment, one light guide 52 is provided in the backlight 51. However, by providing a plurality of light guides, local dimming control for separately controlling the luminances of the light guides may be performed. For example, as shown in FIG. 11, three light guides 52 are provided near the rear side of one liquid crystal panel 50. Three light sources 53a are provided along each of the two incidence end faces 52a of each light guide 52 opposite to each other. The light sources 53a are connected to the light source driving section 55 through wires.

Here, the light sources 53a of one light guide 52 are connected to the common line for each sub-light source group in a manner similar to the example shown in FIG. 9, and the common lines are connected to each other through the signal delay circuits 80. One common line is connected to the light source driving section 55 for each light guide 52. In addition, the common lines may be connected to the light source driving section 55 without the signal delay circuits 80. Further, the light sources 53a may be separately connected to the light source driving section 55.

The light source driving section 55 calculates a luminance of a region corresponding to each light guide 52 from the luminance information of the video signal which is input from the second display control section 38, and controls the amount of light of the light source group of each light guide 52 on the basis of the calculated luminance. The light amount control is performed by changing the pulse width W (changing the duty ratio) of the driving pulses supplied for each light guide 52 in a manner similar to that of the embodiment. The other configuration is the same as that of the embodiment.

In the embodiment, the present invention is applied to the EVFLCD 41, but can also be applied to the rear side display section 15. Further, the present invention can be applied to not only a digital camera, but also liquid crystal display devices mounted on a video camera, a mobile phone, a smartphone, a game machine, and the like. Furthermore, the present invention can also be applied to liquid crystal display devices such as a personal computer and a television.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A display device comprising:
   a liquid crystal panel;
   a backlight that illuminates the liquid crystal panel with light, the backlight having at least one light guide having a first side and a second side facing the first side on both of which a light source group formed of plural light sources is disposed, and;
   common lines each of which is provided for each of plural sub-light source groups divided from the light source group, the light sources included in each of the sub-light source groups being connected commonly to one of the common lines; and
   a light source driving section to which one of the plural common lines is connected, the light source driving section supplying driving pulses to the connected common line,
   wherein each of the sub-light source groups includes at least one of the light sources on the first side and at least one of the light sources on the second side, and the light source on the first side and the light source on the second side belonging to the same sub-light source group are not facing each other,
   wherein each of the plural common lines except the common line connected to the light source driving section are connected through at least one signal delay circuit to the common line connected to the light source driving section, and
   wherein the driving pulses are supplied to each of the sub-light source groups at respectively different timings.

2. The display device according to claim 1, wherein the light source driving section changes an amount of light of each sub-light source group by changing pulse widths of the driving pulses.

3. The display device according to claim 2, further comprising a luminance detection section that detects a luminance of a video on the basis of a video signal supplied to the liquid crystal panel,
   wherein the light source driving section changes the amount of light in accordance with the luminance which is detected by the luminance detection section.

4. The display device according to claim 3, wherein the light source driving section decreases the amount of light in accordance with a degree of a decrease in the luminance of the video.

5. The display device according to claim 4, wherein the light source driving section supplies the driving pulses to each sub-light source group at predetermined time periods.

6. The display device according to claim 5, wherein the light source driving section matches the pulse widths of the driving pulses with the time periods in a case where the amount of light is maximized.

7. The display device according to claim 3,
   wherein a plurality of the light guides is provided in the backlight,
   wherein the luminance detection section detects a luminance of a region corresponding to each light guide on the basis of the video signal, and
   wherein the light source driving section changes the amount of light for each light guide, in accordance with the luminance which is detected by the luminance detection section.

8. The display device according to claim 3, further comprising:
   a video signal correction section that corrects a gain in luminance information of the video signal in accordance with an amount of change in the amount of light; and
   a liquid crystal driving section that drives the liquid crystal panel on the basis of the video signal of which the gain is corrected by the video signal correction section.

9. A finder device comprising:
   a liquid crystal panel;
   a backlight that illuminates the liquid crystal panel with light, the backlight having at least one light guide having a first side and a second side facing the first side on both of which a light source group formed of plural light sources is disposed, and;
   common lines each of which is provided for each of plural sub-light source groups divided from the light source group, the light sources included in each of the sub-light source groups being connected commonly to one of the common lines; and
   a light source driving section to which one of the plural common lines is connected, the light source driving section supplying driving pulses to the connected common line,
   wherein each of the sub-light source groups includes at least one of the light sources on the first side and at least one of the light sources on the second side, and the light source on the first side and the light source on the second side belonging to the same sub-light source group are not facing each other, wherein each of the plural common lines except the common line connected to the light source driving section are connected through at least one signal delay circuit to the common line connected to the light source driving section, and wherein the driving pulses are supplied to each of the sub-light source groups at respectively different timings.

\* \* \* \* \*